United States Patent [19]
Ledley

[11] Patent Number: 4,656,594
[45] Date of Patent: Apr. 7, 1987

[54] OPERATOR-INTERACTIVE AUTOMATED CHROMOSOME ANALYSIS SYSTEM PRODUCING A KARYOTYPE

[75] Inventor: Robert S. Ledley, Silver Spring, Md.

[73] Assignee: National Biomedical Research Foundation, Washington, D.C.

[21] Appl. No.: 730,421

[22] Filed: May 6, 1985

[51] Int. Cl.[4] .................. G06F 15/46; G06F 15/42; G06G 7/60; G06K 9/00
[52] U.S. Cl. .................................. 364/498; 364/415; 382/6; 358/96
[58] Field of Search ................. 358/96; 364/415, 416, 364/900; 382/6

[56] References Cited

U.S. PATENT DOCUMENTS

| | | | |
|---|---|---|---|
| 3,833,796 | 9/1974 | Fetner et al. | 382/6 |
| 3,883,852 | 5/1975 | Cotter | 364/900 |
| 3,908,078 | 9/1975 | Auerbach et al. | 382/6 |
| 4,054,782 | 10/1977 | Weibel | 364/555 |
| 4,075,658 | 2/1978 | de Cosnac et al. | 358/96 |
| 4,122,518 | 10/1978 | Castleman et al. | 364/300 |
| 4,125,828 | 11/1978 | Resnick et al. | 364/416 X |
| 4,199,748 | 4/1980 | Bacus | 364/416 X |
| 4,210,419 | 7/1980 | Castleman | 364/415 |
| 4,404,683 | 9/1983 | Kobayashi et al. | 364/416 X |
| 4,503,555 | 3/1985 | Brimhall, Jr. et al. | 382/6 |
| 4,562,593 | 12/1985 | Ooe et al. | 382/6 |

OTHER PUBLICATIONS

Ledley et al., "Introduction to Chromosome Analysis", Comput. Biol. Med., vol. 2, pp. 107–128 (1972).
Lubs et al., "Automated Analysis of Differentially Stained Human Chromosomes" *Nobel 23–Chromosome Identification* (1973).
Golab, "MACDAC-An Inexpensive and Complete Biomedical Input and Output Display System", *23rd ACEMB*, Wash. Hilton Hotel, Wash. D.C., Nov. 15–19, 1979.

*Primary Examiner*—Errol A. Krass
*Assistant Examiner*—Joseph L. Dixon
*Attorney, Agent, or Firm*—Joseph G. Seeber

[57] ABSTRACT

An operator-interactive automated chromosome analysis system is employed by an operator to locate and identify acceptable metaphase spreads, form a karyotype by rearranging the identified metaphase spreads in accordance with a predetermined arrangement of the twenty-three pairs of chromosomes naturally occurring in human beings, and display the karyotype on a display or a hardcopy printout, or both. The system comprises the following elements: a mechanized microscope system; a microscope and closed circuit television arrangement for microscopically scanning the chromosome spreads; a metaphase detector producing an output indicating metaphase detection; a television monitor for viewing the detected metaphase spreads; a photographic printer for producing a hardcopy representation of the detected metaphase spreads; and a computer, including a video interface, for controlling the mechanized microscope stage to locate the metaphase spreads, for analyzing the metaphase detector output to determine the location and grades of metaphases, for displaying a patient identifier on the monitor or hardcopy, and for rearranging and displaying the detected metaphase spreads so as to produce the karyotype.

14 Claims, 20 Drawing Figures

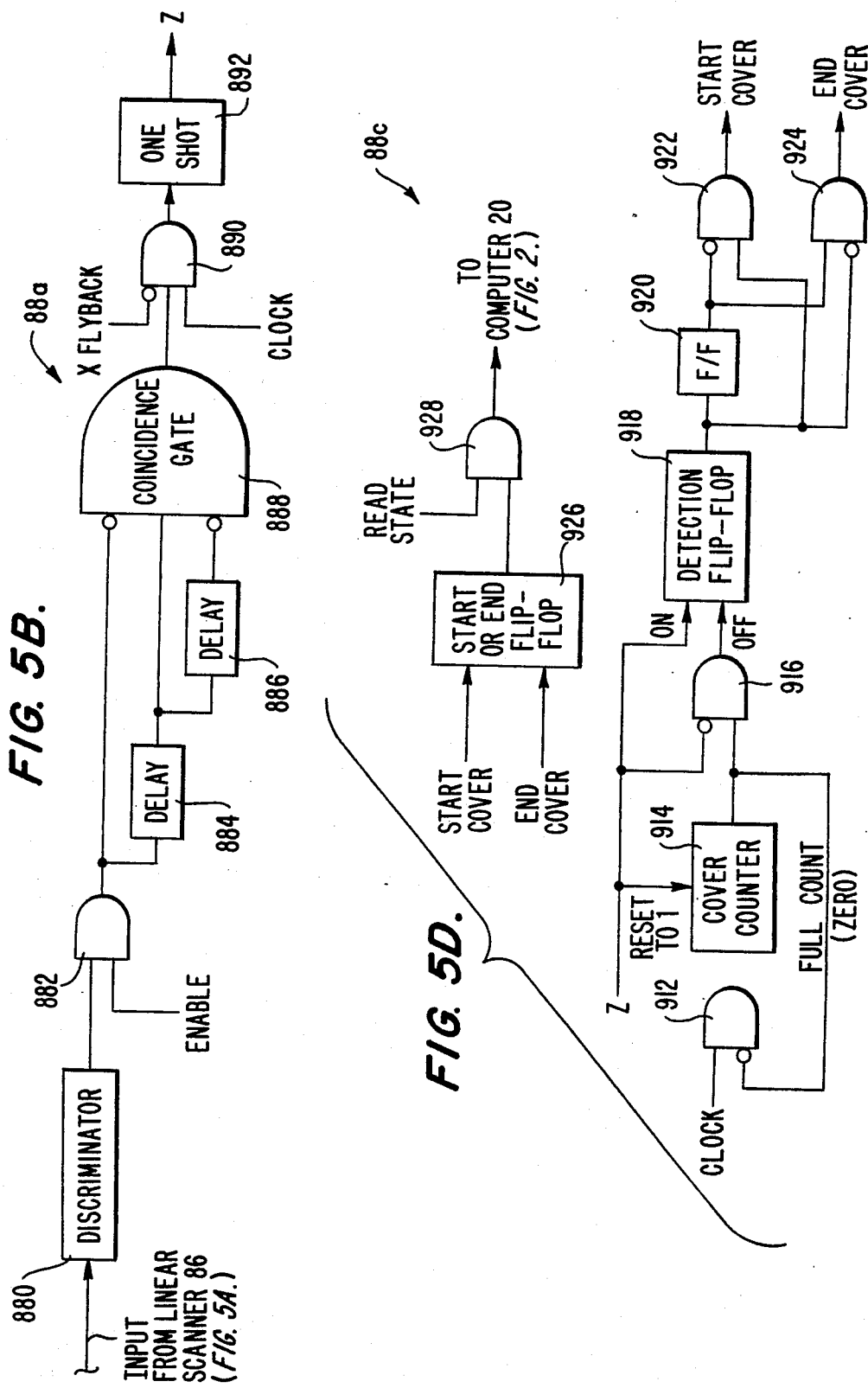

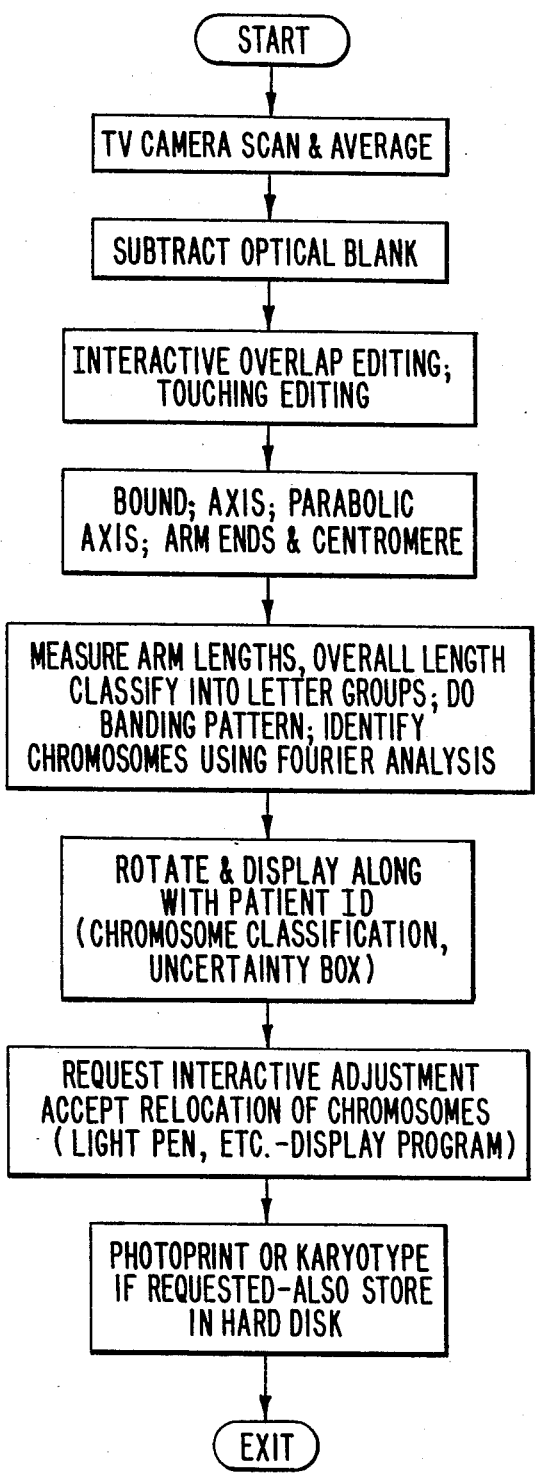

OPERATOR-INTERACTIVE AUTOMATED CHROMOSOME ANALYSIS SYSTEM PRODUCING A KARYOTYPE

DESCRIPTION

1. Technical Field

The present invention relates to operator-interactive automated chromosome analysis producing a karyotype. More specifically, the present invention relates to a system which can be utilized by an operator to locate and identify acceptable metaphase spreads, form a karyotype, and display the karyotype either on a display screen or on a printout, or both.

2. Background Art

For many years chromosome analysis was carried out using manual techniques which were very tedious and time-consuming. With the advent of modern technology, the manual techniques gave way to the development of semi-automated chromosome analysis systems which still required significant manual intervention by the operator.

The conventional chromosome analysis technique commences with the obtaining of white blood cells and their placement into a bottle of culture medium wherein they grow. In the growing process, the chromosomes pass through various phases, and the addition of certain known chemicals stops the progression of phases at a given metaphase. At that point, the banded chromosome consists of four arms branching from a centromere. There are twenty-three pairs of chromosomes in the normal person.

FIG. 1A is an illustration of the twenty-three pairs of chromosomes found in the normal person. However, when first seen during the performance of a chromosome analysis technique, the various chromosome pairs are randomly positioned, as illustrated in FIGS. 1B and 1C.

In accordance with the conventional technique, the chromosome spread is placed onto a microscope slide, stained and flattened out into an array measuring in the range of 50-60 microns, each chromosome measuring approximately 3 to 10 microns in length, 2 microns in width, and ½ micron in thickness, as illustrated in FIG. 1D.

The conventional technique then calls for "good" metaphase spreads to be found using manual methods. A "good" metaphase spread is defined as one in which the chromosomes are not overlapping, are not over extended, fit within the field of microscopic examination, and stain well. Once a "good" metaphase spread is obtained, a karyotype is produced; that is, the karyotype identifies each chromosome of the spread as being a given one of the twenty-three pairs of chromosomes found in the normal person. The karyotype procedure produces a picture of the chromosome spreads similar to that shown in FIG. 1E.

Once the picture of the chromosome spread is obtained, a two-tier analysis can be performed to distinguish the different types of chromosomes, the first technique based on an "arm length ratio and size" technique, wherein the twenty-three pairs of chromosomes can be divided into ten groups, and the second technique based on "banding", which can be utilized to distinguish among the various chromosome pairs in each group. The latter techniques are well-known in the prior art.

Further information relative to chromosome analysis can be obtained by referring to "Introduction to Chromosome Analysis" by Robert S. Ledley et al., appearing in *Comput. Biol. Med.*, vol. 2, pp. 107-128 (1972). Earlier systems for the automated analysis of chromosomes are disclosed in "Automated Analysis of Differentially Stained Human Chromosomes" by H. A. Lubs and R. S. Ledley, Nobel 23: *Chromosome Identification,* pp. 61-76 (1973), and in "MACDAC—An Inexpensive and Complete Biomedical Input Display System" by Thomas J. Golab, 23rd ACEMB, Washington Hilton Hotel, Washington, D.C. (Nov. 15-19, 1970). Still other earlier systems and background information are disclosed in the following U.S. Pat. Nos.: 3,833,796; 3,908,078; 4,054,782; 4,122,518; and 4,210,419.

DISCLOSURE OF INVENTION

The present invention relates to an operator-interactive automated chromosome analysis system producing a karyotype, and more specifically to a system which can be utilized by an operator to locate and identify acceptable metaphase spreads, form a karyotype, and display the karyotype either on a television (TV) display screen or on a printout, or both.

In particular, the system of the subject invention comprises the following elements: a computer, including a video interface, for controlling a mechanized microscope stage, analyzing a metaphase detector current output to determine the location and grades of metaphases, displaying a patient identifier on a monitor, relocating and displaying chromosome spreads, forming a karyotype and displaying same, and interactively correcting the karyotype prior to printing a hardcopy thereof; a mechanized microscope stage for manually or automatically controlling microscopic viewing of chromosome spreads; a microscope and closed circuit TV camera arrangement; a metaphase detector producing an output indicating metaphase detection; a television monitor and associated control circuitry; and a photographic printer for producing a hardcopy output.

Therefore, it is an object of the present invention to provide an operator-interactive automated chromosome analysis system producing a karyotype.

It is an additional object of the present invention to provide an operator-interactive automated chromosome analysis system in which a computer system, which includes a video interface, controls a mechanized microscope stage for examining, relocating and displaying chromosome spreads.

It is an additional object of the present invention to provide an operator-interactive automated chromosome analysis system having a computer system which analyzes a metaphase detector output to determine the location and grades of metaphases.

It is an additional object of the present invention to provide an operator-interactive automated chromosome analysis system having a computer system which forms a karyotype and displays same, while providing the capability of interactive correction of the karyotype prior to printing a hardcopy thereof.

It is an additional object of the present invention to provide an operator-interactive automated chromosome analysis system having a metaphase detector for producing a metaphase detector output which, upon analysis, determines the location and grades of metaphase.

It is an additional object of the present invention to provide an operator-interactive automated chromosome analysis system which has the capabilities of displaying a karyotype on a television monitor and printing a hardcopy of the karyotype.

The above and other objects that will hereinafter appear, and the nature of the invention, will be more clearly understood by reference to the following description, the appended claims, and the accompanying drawings.

BRIEF DESCRIPTION OF DRAWINGS

FIGS. 5B thru 5E are logic diagrams of the metaphase detector circuits of FIG. 5A.

FIGS. 10, 11 and 12 are flowcharts of more detailed operations performed by the computer system of FIG. 2.

BEST MODE FOR CARRYING OUT THE INVENTION

The present invention will now be more fully described with reference to FIG. 2, which is a block diagram of the system of the present invention, and with further reference to FIGS. 3 thru 8, as described above.

Figure 2:
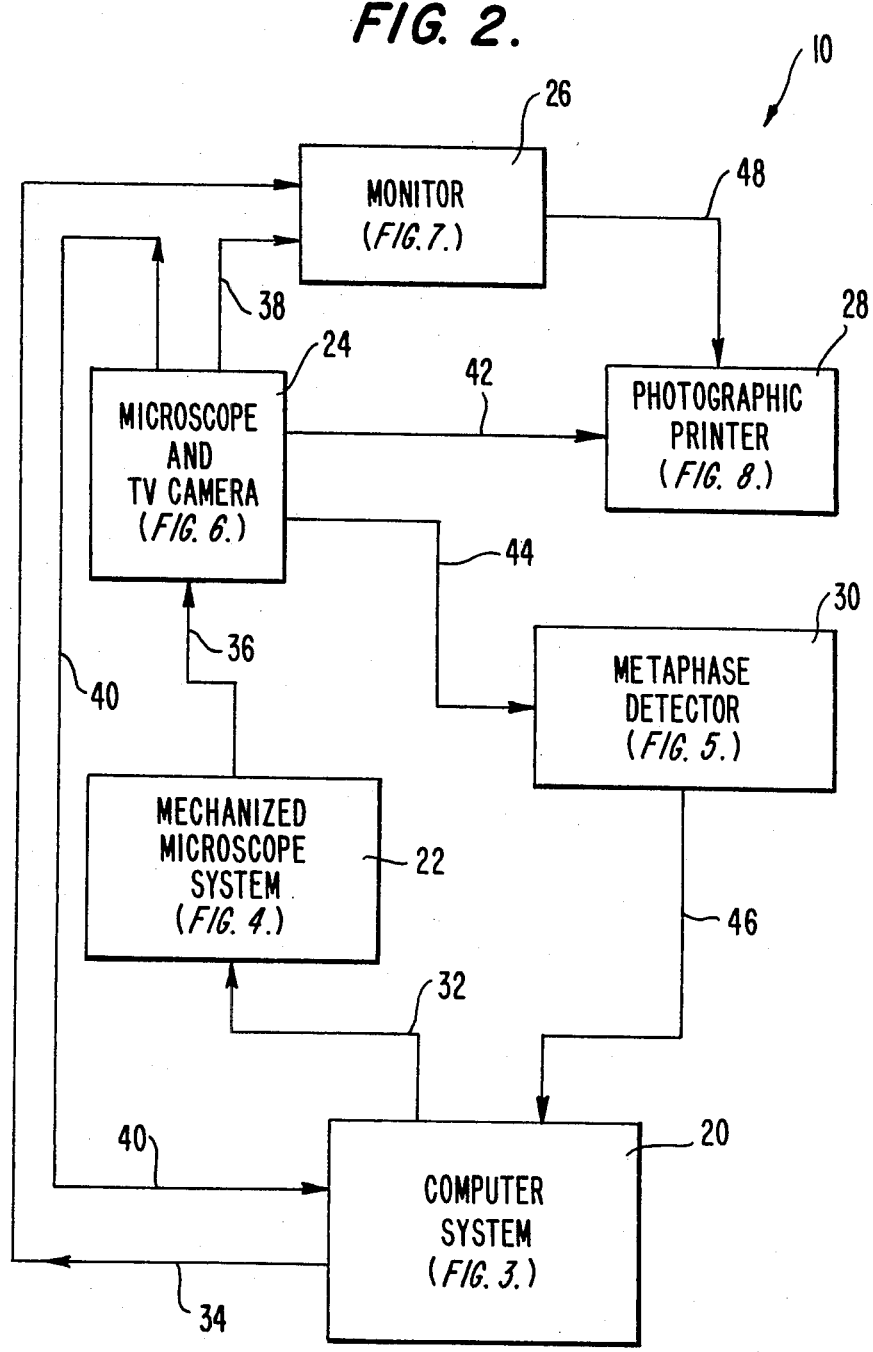
FIG. 2 is a block diagram of the system of the present invention.

As seen in FIG. 2, the system 10 of the present invention comprises a computer system 20, mechanized microscope system 22, microscope and TV camera 24, monitor 26, photographic printer 28, and metaphase detector 30.

The operation of the system will now be described with reference to FIGS. 2 thru 8. Once a chromosome sample is obtained, placed on a slide, stained and flattened out into an array, the slide is placed on the mechanized stage 70 (FIG. 4) in mechanized microscope system 22 (FIG. 2). The slide is then moved on the stage 70 relative to the microscope and TV camera 24 by means of an actuation output signal 32 generated by the computer system 20 under program control.

When a good metaphase spread comes into view under the microscope and TV camera 24 (via optical path 36), presence of the good metaphase spread is detected by metaphase detector 30 (connected to the microscope and TV camera 24 via optical path 44), and the computer system 20 is notified by metaphase detector 30 via the generation of output 46. At this point, the computer system 20—operating in the interactive mode—notifies the operator of the detection of a metaphase spread, and displays the metaphase spread on the monitor 26 (via output 38 of the microscope and TV camera 24). In this manner, the operator is afforded the opportunity of selecting a "good" metaphase spread based on its quality. Once this procedure is performed for each of the metaphase spreads on the chromosome slide, the computer system 20 has memorized each of the locations of "good" metaphase spreads selected by the operator.

It should be recognized that the latter procedure can be performed in a two-step process. The first step amounts to an automated scan of the slide sample in a predetermined manner, with each metaphase spread being detected by metaphase detector 30, and with the location of each detected metaphase spread being memorized by the computer system 20. During the second step, stage 70 is moved, again in an automated manner, to each memorized location so that each previously detected metaphase spread will be viewable by the microscope and TV camera 24, each previously detected metaphase spread then being presented to the operator in sequence on monitor 26, whereby the operator is afforded the opportunity to select or not select the metaphase spread.

Once the computer system 20 has memorized the location of each of the detected metaphase spreads selected by the operator, the karyotype procedure is performed, by means of which each detected and selected metaphase spread is identified as a given one of the twenty-three pairs of metaphase spreads. The latter can be accomplished in either a semi-automated or automated mode. In a semi-automated mode, each previously detected and selected metaphase chromosome is presented in turn to the operator, who then identifies the particular chromosome as being one of the twenty-three pairs of chromosomes, inputting his identification into the computer by use of conventional computer console controls. In the automated mode, the identification of each chromosome is carried out completely by the computer system 20, operating in accordance with well-known picture processing techniques.

Figure 1A:
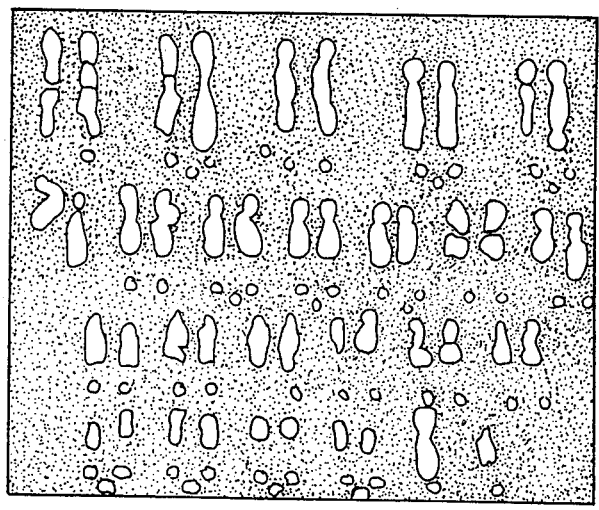
FIG. 1A is an illustration of the twenty-three pairs of chromosomes found in the normal person.
Figure 1B:
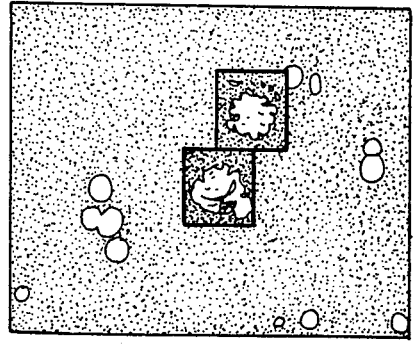
FIGS. 1B and 1C are illustrations of the random positioning of the chromosome pairs when first seen in a chromosome spread.
Figure 1C:
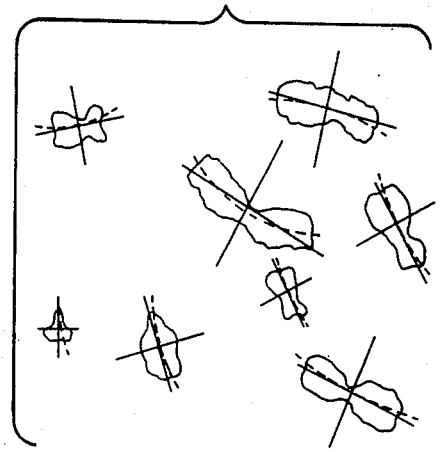
Figure 1D:
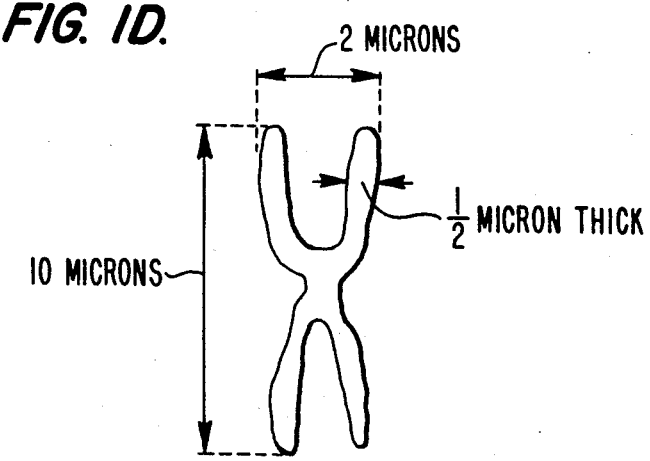
FIG. 1D is an illustration of a chromosome.
Figure 1E:
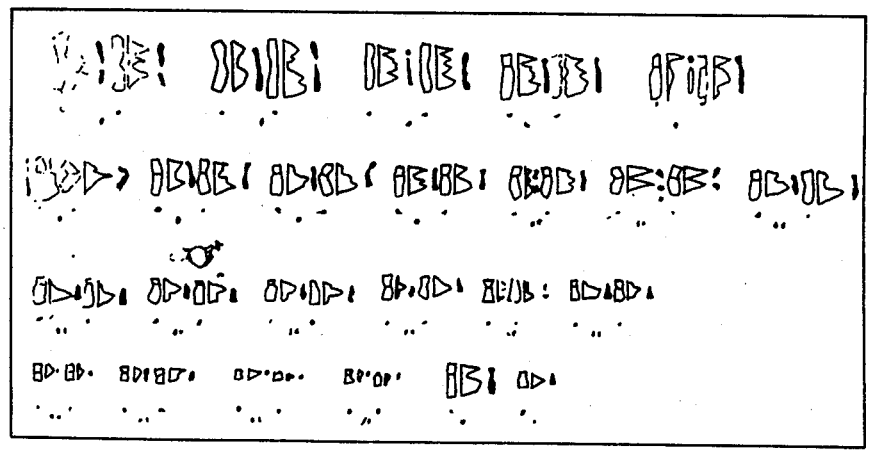
FIG. 1E is an illustration of a karyotype in which the twenty-three pairs of chromosomes are identified.

Once each of the detected and selected metaphase chromosomes has been identified, a karyotype picture (and other related information, such as a patient identifier, if desired) can be displayed by the computer system 20 on the monitor 26 (via output 34), and can be printed in hardcopy by means of photographic printer 28 (via output 48 of monitor 26). In this manner, a picture generally resembling the karyotype of FIG. 1E can be obtained.

Of course, other capabilities can be provided in the system of the subject invention. For example, the operator can be provided with the capability of arranging or rearranging the detected and selected metaphase chromosomes which form the karyotype once the latter is formed in the manner described above. The provision of this capability, and of other capabilities as well, is limited only by the level of programming skill available.

Figure 3:
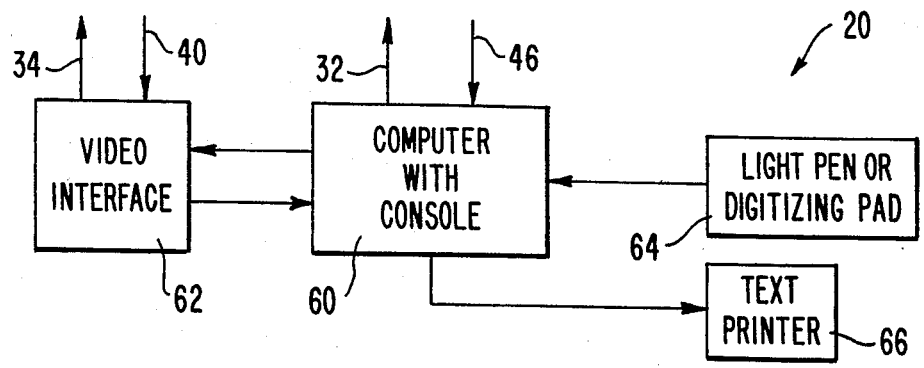
FIG. 3 is a block diagram of the computer system of FIG. 2.

FIG. 3 is a block diagram of the computer system of FIG. 2. As seen therein, the computer system 20 comprises a computer with console 60, video interface 62, a light pen or digitizing pad 64, and a text printer 66.

During the first step of the previously described two-step process, a chromosome slide is examined, preferably under a 20× microscope, and displayed on monitor 26 (via output 38 of FIG. 2) The computer 60 controls the movement of the stage 70 in system 22 via output 32 (of course, other means can be used to control movement of the stage 70 if desired), analyzes the metaphase detection output 46 of metaphase detector 30 to determine the location and grade/quality of metaphases, and displays a patient identifier on the monitor 26 (via output 34).

During the second step of the two-step procedure, the chromosome slide is viewed under microscope and TV camera 24, preferably set for 100× viewing. Each chromosome spread previously detected is relocated and displayed on monitor 26 (via output 38), selection or non-selection of each chromosome spread is recorded in the inherent memory (not shown) of the computer 60, and each selected metaphase spread can be printed by photographic printer 28 (via outputs 42 or 48) if desired. With respect to the selection of metaphase spreads by the operator, the operator can use light pen or digitizing pad 64 in a conventional manner to advise the computer 60 of selection or non-selection of a particular metaphase spread.

To continue with the second step of the two-step process, as described above, karyotyping of the metaphase spreads and a display of the results are carried out by the computer 60. In this regard, the capabilities of interactive correction of the karyotype and printing of the karyotype by photographic printer 28 (via output 48) are provided.

Further referring to FIG. 3, the video interface 62 comprises conventional circuitry for performing the following functions: (1) digitization of analog signals received from the microscope and TV camera 24 via output 40; (2) conversion of digital signals (e.g., patient ID) from the computer 60 to analog form for transmission, via output 34, to the monitor 26; and (3) other interface capabilities or functions as required (e.g., addressing of the video memory 62 by the computer 60). Video interface 62 can be implemented by Video Memory Board MFB-512-8-4-M and A/D,D/A Board MFB-512-8-1-M, manufactured by Imaging Technology, Inc. of Woburn, Mass.

The printer 66 of FIG. 3 can be any conventional text printer normally associated with the computer 60. In the latter regard, the computer 60 can be any large-scale, digital computer (such as the MC68000 manufactured by Motorola, Inc. or the "Lyra (10)" manufactured by Cosma Systems, Inc. of Sunnyvale, Calif.) having an inherent digital memory for picture storage, including a large-scale (10 Mbyte) disk memory.

Figure 4:
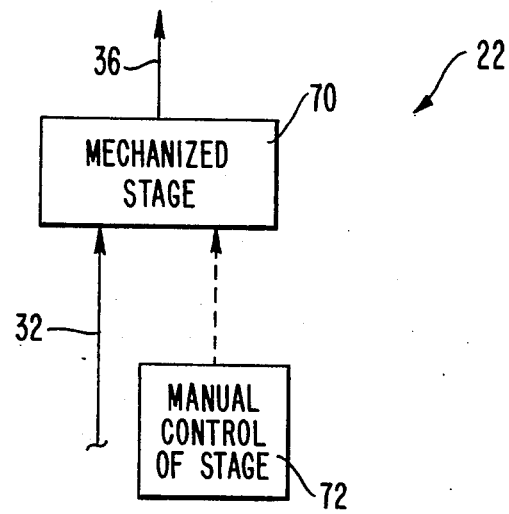
FIG. 4 is a block diagram of the mechanized microscope system of FIG. 2.

FIG. 4 is a block diagram of the mechanized microscope system of FIG. 2. As seen therein, the system 22 comprises a mechanized stage 70 and a manual control 72 for manual control of the mechanized stage 70. Automated control of the mechanized stage 70 is provided via output 32 from the computer system 20. Thus, the system 22 can be any conventional mechanized stage and manual control, including (for example) X-drive and Y-drive motors, automatic focus holder, stage gears and hand box. For example, system 22 can be implemented by using Stage and Motors ATS303MM/65SMW and Controllers 10K7/4005, manufactured by Aerotech, Inc.

Figure 5A:
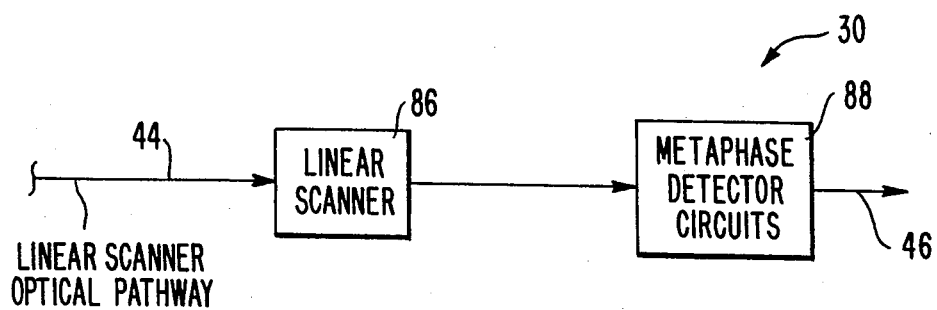
FIG. 5A is a block diagram of the metaphase detector of FIG. 2.

FIG. 5A is a block diagram of the metaphase detector 30 of FIG. 2. As seen therein, the metaphase detector 30 includes a linear scanner 86 and metaphase detector circuits 88.

With respect to the automated detection of chromosome spreads by the computer system 20, it is to be understood that there is a well-known technique known as the "cover" technique for determining whether or not a chromosome spread is present. This "cover" technique is discussed in the previously mentioned article "Introduction to Chromosome Analysis" by Robert S. Ledley et al., *Comput. Biol. Med.*, vol. 2, pp, 107-128 (1972)—see FIG. 5A thereof. The present invention takes advantage of the theoretical principles set forth therein in achieving automated detection of chromosome spreads using the linear scanner 86 and metaphase detector circuits 88 of FIG. 5A.

In the latter regard, once a field of a chromosome spread (a 400 micron field) is obtained, it is projected onto the 1024 elements of the linear scanner 86 contained within the metaphase detector 30. Then, under program control, computer system 20 actuates the stage 70 so as to move the slide in a direction perpendicular to the linear array of linear scanner 86 so as to obtain profiles of the chromosome spread across the direction of movement. As will be seen in more detail below, a series of electrical pulses resulting therefrom—defined as a "cover"—indicates that a chromosome spread is present.

In this manner, the metaphase detector circuits 88—in conjunction with the computer 20—are able not only to detect a chromosome spread, but also to determine where the chromosome spread begins and ends. Also, computer system 20—under program control—processes the series of outputs 46 so as to decide whether a spurious "cover" (indicating no spread) is present, or whether a collection of "covers" (indicating the existence of a spread) is present.

By special programming, well within the skill of programmers of ordinary skill in the art, the computer system 20 can also be provided with the capability of grading the "covers" according to whether they are excellent, good, fair, etc.

To be more specific, with reference to FIG. 5A, in operation, linear scanner 86 scans a field or line of interest in the optical output 44 of microscope and TV camera 24 to detect the presence or absence of an object at each point along the line of scan; e.g. presence of an object at a given point results in generation of low voltage (approximately 0 volts), while absence of an object at a given point results in generation of a positive voltage (approximately 1 volt). In this way, linear scanner 86 produces an analog signal suitable for processing by metaphase detector circuits 88. By way of example, linear scanner 86 can be implemented using a Line-Scan Camera, Model SSD/300, manufactured by Fairchild Camera and Instrument Corporation.

FIG. 5B is a logic diagram of a detection portion 88a of the metaphase detector circuits 88 of FIG. 5A. As seen therein, the portion 88a comprises discriminator 880, AND gate 882, delay stages 884 and 886, coincidence gate 888, AND gate 890, and one-shot device 892.

In operation, discriminator 880 receives the input from linear scanner 86 (FIG. 5A), and determines when an object (a chromosome spread) appears by detecting, in a conventional manner, whether or not the voltage level of the spot at that point is greater or less than a certain threshold value. When the voltage level is less than the threshold value (i.e., equals 0 volts indicating non-passage of light through an object present at the spot being considered), the discriminator 880 provides a logical "1" output to AND gate 882. Conversely, when the voltage level exceeds the threshold value (i.e., equals 1 volt, indicating passage of light through the spot), a logical "0" output is provided.

AND gate 882, as enabled by input ENABLE (from the computer system 20 of FIG. 2), passes the output of discriminator 880 to delay stage 884. As discriminator 880 operates on two further spots, in sequence, corresponding outputs are provided via AND gate 882 to delay stage 884 and gate 888 (the top input in FIG. 5C), with the previous (first) discriminator output being shifted into delay stage 886. Thus, once the third sequential discriminator output has been passed, delaying of the previous discriminator outputs in delay stages 884 and 886, respectively, is such that coincidence gate 888 receives, in parallel and simultaneously, the three sequential discriminator outputs.

It should be understood that input ENABLE occurs with a frequency corresponding to the desired sampling rate of spots on the line of scan. It should also be understood that the delays of delay elements 884 and 886 are set so as to sample spots separated, in the line of scan, by a predetermined distance. Thus, when discriminator 880 provides a sequential digital output of 0's and 1's, AND gate 882 as enabled by ENABLE will provide, as an example, the following digital output (read from right to left): 000011110000. After a period of time equal to the combined delays of elements 884 and 886, coincidence gate 888 will receive a 001 input (derived from the underlined bits of the digital output 0000<u>111</u>10000). After a subsequent period of time, corresponding to the sampling rate of ENABLE, a 011 input will be presented to gate 888. Subsequent inputs will be 010, 010, 110 and 100.

Coincidence gate 888 is designated to detect a 010 input, indicating that a spot exceeding the threshold level, flanked by spots not exceeding the threshold level, has been detected. Thus, the output of coincidence gate 888 will be a logical "1" during those two instances (in the example above) when the pattern 010 occurs, indicating the presence of a chromosome spread; otherwise, gate 888 will have a logical "0" output.

The output of coincidence gate 888 is passed to one-shot device 892 via AND gate 890, as enabled by a CLOCK input from the computer system 20 of FIG. 2, and as further enabled by the inverse of an XFLY-BACK input from the linear scanner 86 of FIG. 5A (that is, the AND gate 890 functions only during periods not corresponding to the X-flyback period of the linear scanner). As is well-known, one-shot device 892 generates a logical "1" output for a predetermined period of time after receiving a logical "1" input.

Figure 5C:
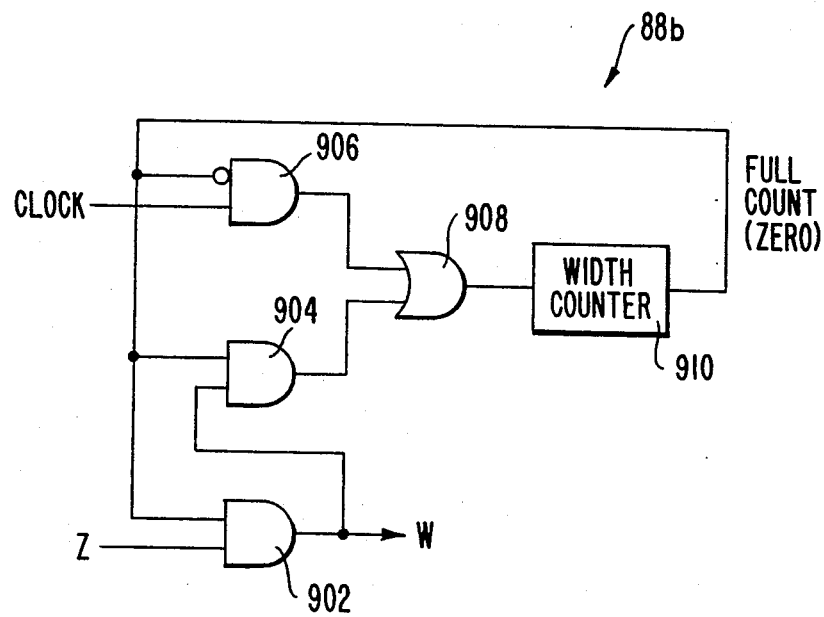

As the detection process of FIG. 5B is carried out, a count of detected objects is made. However, it should be recognized that each 010 pattern cannot be counted as an object, for it may occur several times for a particular chromosome spread (as in the example cited above). Therefore, a width counter arrangement—as shown in FIG. 5C—is used. The width counter arrangement 88b of FIG. 5C is seen to comprise AND gates 902, 904 and 906, and OR gate 908, in combination with a width counter 910.

In operation, after an object count is first made by the circuit 88a of FIG. 5B, which generates a corresponding Z output, the width counter 910 counts to "one" as enabled by the FULLCOUNT and Z inputs to AND gate 902 and conveyed by AND gate 904 and OR gate 908. Counting continues due to enablement of counter 910 by the inverse of FULL COUNT and a CLOCK input to AND gate 906, as conveyed via OR gate 908. In this way, once an object is initially detected, input Z is passed as output W, but then input Z is blocked from passage through AND gate 902 by the inverse of FULL COUNT until counter 910 counts to its "full count", and thus another object cannot be tallied until the counter 910 has completed its count. In this manner, an object detected by the circuit of FIG. 5B will generally be counted only once by the arrangement of FIG. 5E (to be discussed below).

FIG. 5D is a logic diagram defining a total-cover-width measurement circuit making up a portion 88c of the metaphase detector circuits 88 of FIG. 5A. As seen therein, the portion 88c comprises AND gates 912, 916, 922, 924 and 928, a cover counter 914, a detection flip-flop 918, a J-K flip-flop 920, and a start or end flip-flop 926.

The objective of this arrangement is to carry a "cover" over detected objects that are close enough together to constitute a single chromosome spread. Thus, when a chromosome is detected, as indicated by the Z output of portion 88a (FIG. 5B), cover counter 914 is reset and started, and the cover is "up". If another chromosome is detected before the counter 914 runs out, the counter 914 is again reset so as to recommence counting from an initial state and, in this way, the cover is kept "up" over all chromosomes that are sufficiently close together. Whereas initial detection of a chromosome turns "on" the detection flip-flop 918, if the cover counter 914 runs out before another chromosome is detected, the detection flip-flop 918 is turned "off" via AND gate 916.

Each cover is characterized by a "start" and an "end". At the start of a cover, detection flip-flop 918 is turned on, and this results in resetting of flip-flop 920 so that an output START COVER is provided by AND gate 922. Conversely, when a cover is ended, detection flip-flop 918 is turned off, and this results in setting of flip-flop 920 so that an output END COVER is provided by AND gate 924. The latter outputs, START COVER and END COVER, are used to set and reset, respectively, the flip-flop 926. The state of flip-flop 926 is provided to computer 20 (FIG. 2) via AND GATE 928, as enabled by a READ STATE input from computer 20.

In this manner, by proper timing, the computer 20 determines the coordinates of the "start" of a cover and of the "end" of a cover. When a frame or strip has been completely scanned, the computer 20 then determines the location of the chromosome spread by looking at the collection of covers for that particular frame or strip, the latter operation being merely a function of proper programming of the computer 20 by one of ordinary skill in the art.

Figure 5E:
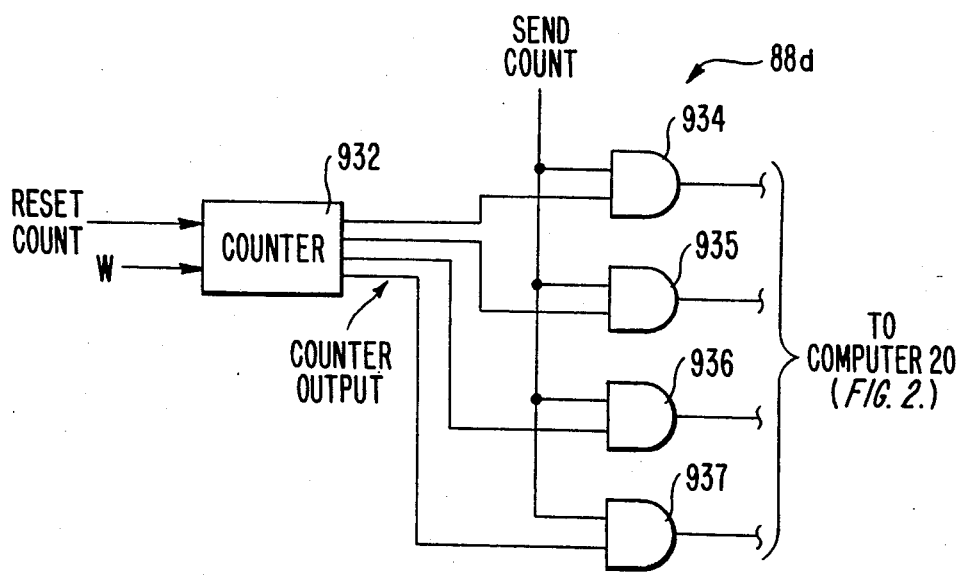

FIG. 5E is a logic diagram of an object-counting portion 88d of the metaphase detector circuits 88 of FIG. 5A. As seen therein, the portion 88d comprises counter 932 and AND gates 934 thru 937.

The purpose of portion 88d is to count the number of objects seen in each cover, and to send that count to the computer 20 of FIG. 2. In this manner, the computer 20, when properly programmed, can estimate if the chromosome spread is "good", that is, if enough objects were "covered" in order to constitute a valid chromosome spread. In general, the philosophy is that a sufficiently rough scan will be made to intersect a chromosome spread in only three or four covers. Isolated objects will have too small a cover. Thus, the location of a chromosome spread can be detected by a rapid scan of the field.

In operation, the counter 932 is reset/initialized by command RESET COUNT from computer system 20, each object detected generates an output W from the portion 88b of FIG. 5C, and successive outputs W are counted in counter 932. Upon command by the computer system 20 of FIG. 2, via input command SEND COUNT, gates 934-937 are enabled to transfer the contents of counter 932 to the computer system 20. Whereas a four-bit counter output is shown in FIG. 5E, any multi-bit counter and counter output can be used.

Figure 6:
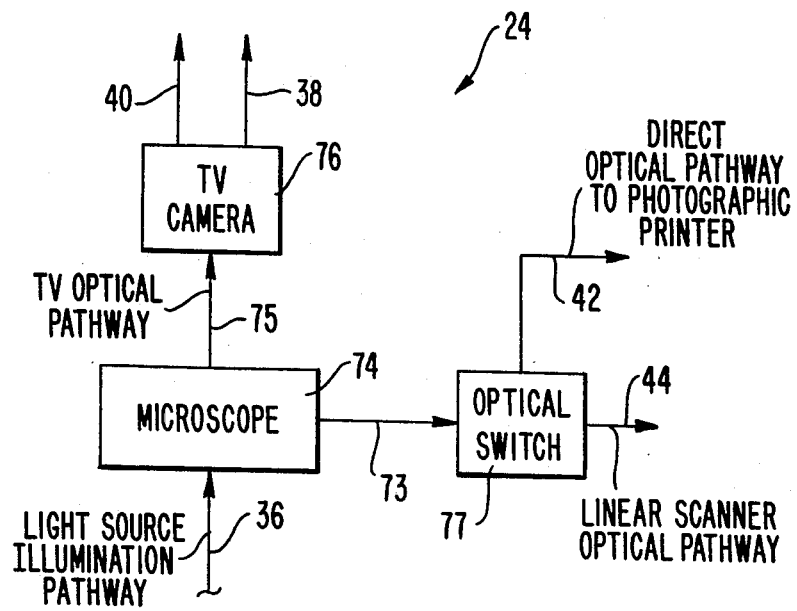
FIG. 6 is a block diagram of the microscope and TV camera of FIG. 2.

FIG. 6 is a block diagram of the microscope and TV camera 24 of FIG. 2, and is seen to comprise microscope 74, television camera 76 and optical switch 77. The microscope 74 can be any conventional microscope having multiple objective power-setting capability (for example, alternatively settable to 20× or 100× power settings). Input line 36 to microscope 74 illustrates the optical input to microscope 74, while output line 75 to television camera 76 represents the optical path thereto. Television camera 76 can be any conventional television camera providing an analog video output 38 to a conventional monitor 26 (FIG. 2) or an analog video output 40 to the computer system 20 (specifically, the video interface 62 of FIG. 3).

It is to be noted that an optical output 73 is also provided from microscope 74 to optical switch 77. Switch 77 provides a direct optical pathway 42 to the photographic printer 28, or an alternative linear scanner optical pathway 44 to the metaphase detector 30 (specifically, the linear scanner 86 of FIG. 5). Switch 77 can be implemented by any conventional optical switch (e.g., a Beam Splitter No. 578, manufactured by Edmund Scientific Company of Barrington, N.J.).

Figure 7:
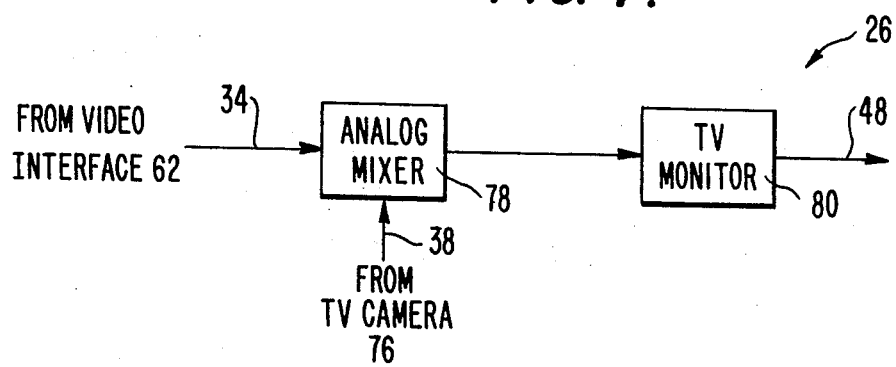
FIG. 7 is a block diagram of the monitor of FIG. 2.

FIG. 7 is a block diagram of the monitor of FIG. 2. Monitor 26 is seen to comprise an analog mixer 78 and a conventional television monitor 80. In a first mode of operation (initial examination of the microscope slide), the mixer 78 receives an analog input 34 from the computer system 20 (video interface 62 of FIG. 3), preferably corresponding to patient ID information, and also receives the video output 38 of microscope and TV camera 24 (specifically, television camera 76 of FIG. 6). Mixer 78 serves to mix the patient identification information from computer system 20 with the video information from the television camera 76, providing a combined video output to the television monitor 80. Monitor 80 is any conventional television monitor for displaying a video signal. In addition, monitor 80 has the capability of providing a video output 48 to the photographic printer 28 of FIG. 2 if a hardcopy is desired.

In a second mode of operation (subsequent display of the karyotype), mixer 78 receives an analog video signal from video interface 62 (in computer system 20) consisting of a combination of karyotype and patient identification information for display on monitor 48. In this mode, the analog video signal received via input 34 is not mixed, but rather it is passed through to the monitor 80.

Figure 8:
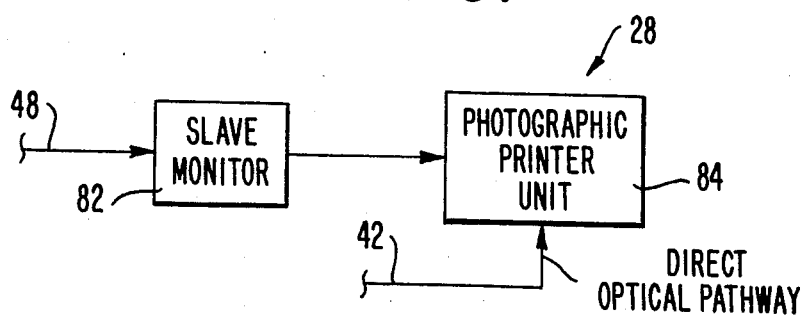
FIG. 8 is a block diagram of the photographic printer of FIG. 2.

FIG. 8 is a block diagram of the photographic printer 28, and is seen to comprise a slave monitor 82 (implemented by any conventional monitor device) and a photographic printer unit 84 (implemented by any conventional printer unit). Photographic printer unit 84 is capable of printing, in hardcopy, a representation of either the video display of monitor 26, as conveyed via output 48 and slave monitor 82, or the direct optical output 42 of microscope and TV camera 24. Photographic printer unit 84 is, for example, implemented by an automatic print processor, such as the "47th Street Photo Speed Printer" manufactured by the 47th Street Darkroom Center of New York, N.Y.

Figure 9:
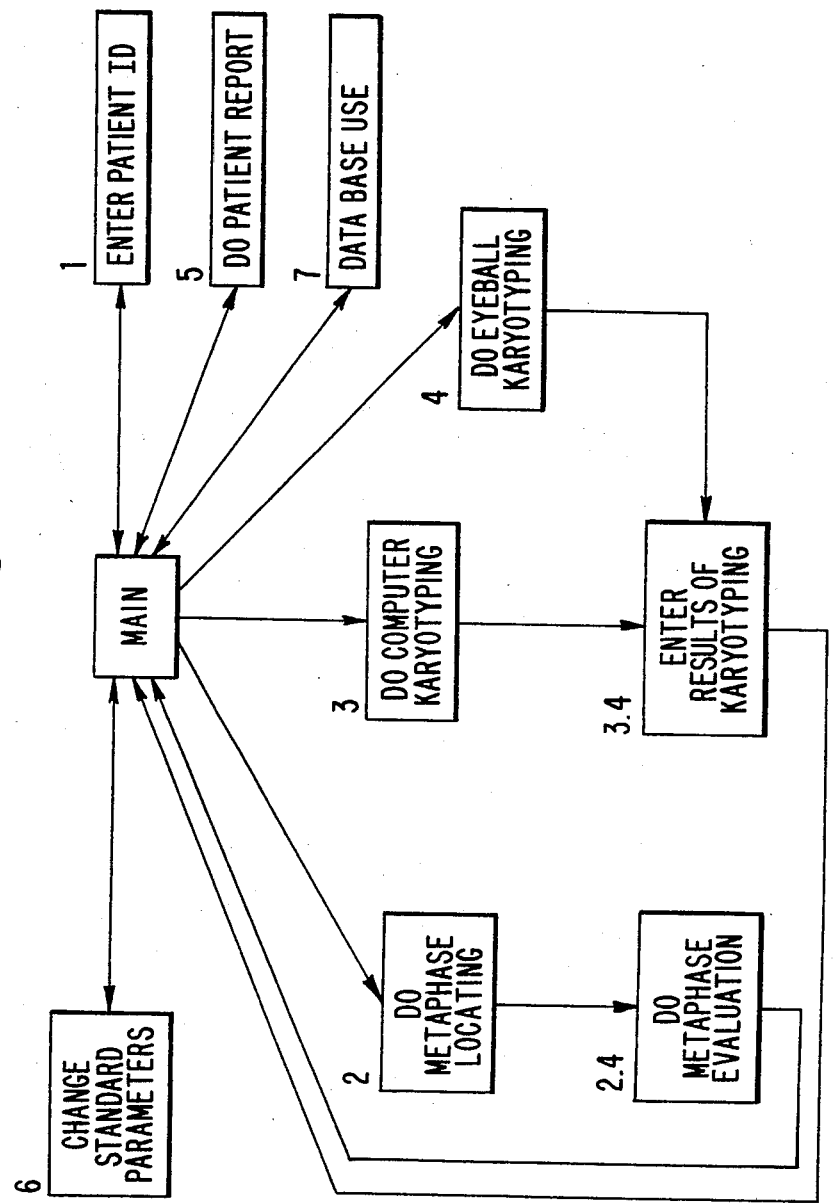
FIG. 9 is a general flowchart of the operations performed by the computer system of FIG. 2.

FIG. 9 is a flowchart of the operations performed by computer system 20 in providing operator-interactive automated chromosome analysis, including the production of a karyotype, as described above. Each numbered block in FIG. 9 corresponds to a step or series of steps which may be taken by the operator, in interaction with the computer system 20 of FIG. 2, in utilizing the present invention to develop a karyotype, such steps or series of steps having been previously described in the detailed description of the operation of the system set forth at the beginning of this section with reference to FIGS. 2 thru 8. Referring to FIG. 9, those steps include the following: (1) the entry of a patient identifier; (2) the location and evaluation of a metaphase spread by the metaphase detector 30 of FIG. 2, followed by notification of the computer system 20, as described above; (3) karyotyping by the computer system 20 in an automated mode discussed above, or "eyeball" karyotyping performed by the operator in conjunction with the computer system 20 operating in a semi-automated mode (each mode having been discussed above); (4) memorization of the results of karyotyping by the computer system 20; and (5) rendering of a patient report in the form of monitor display or hardcopy printout, as discussed above. Other options indicated in FIG. 9 include the updating or changing of standard parameters associated with conventional karyotype procedures (block 6 of FIG. 9) and storage of data in or updating of a data base conventionally stored in the computer system 20 (block 7 of FIG. 9).

Figure 10:
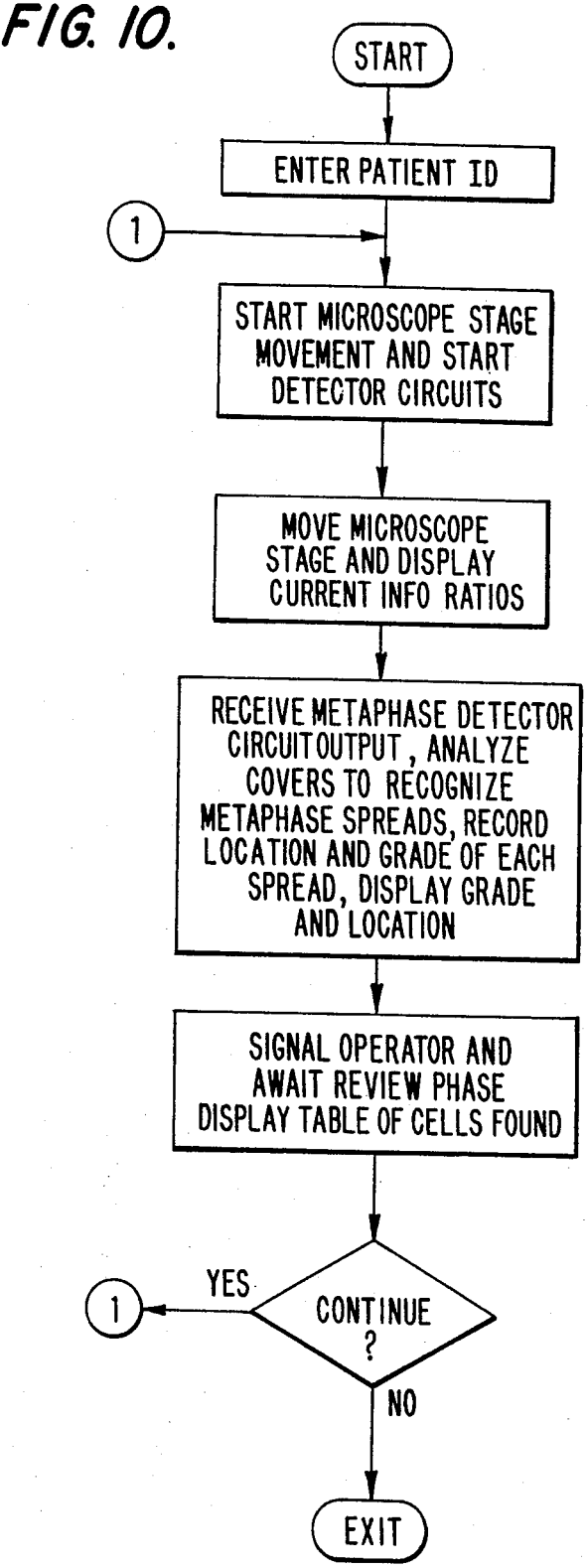

FIG. 10 is a flowchart of one embodiment of the program implemented by computer system 20 in performing initial location of metaphases. More particularly, the flowchart of FIG. 10 sets forth a series of steps taken by the operator and/or the computer system 20 of FIG. 2 in performing the procedure of initial location of metaphase spreads, such procedure having been discussed previously in this section in conjunction with a description of the operation of the system with reference to FIGS. 2 thru 8.

Figure 11:
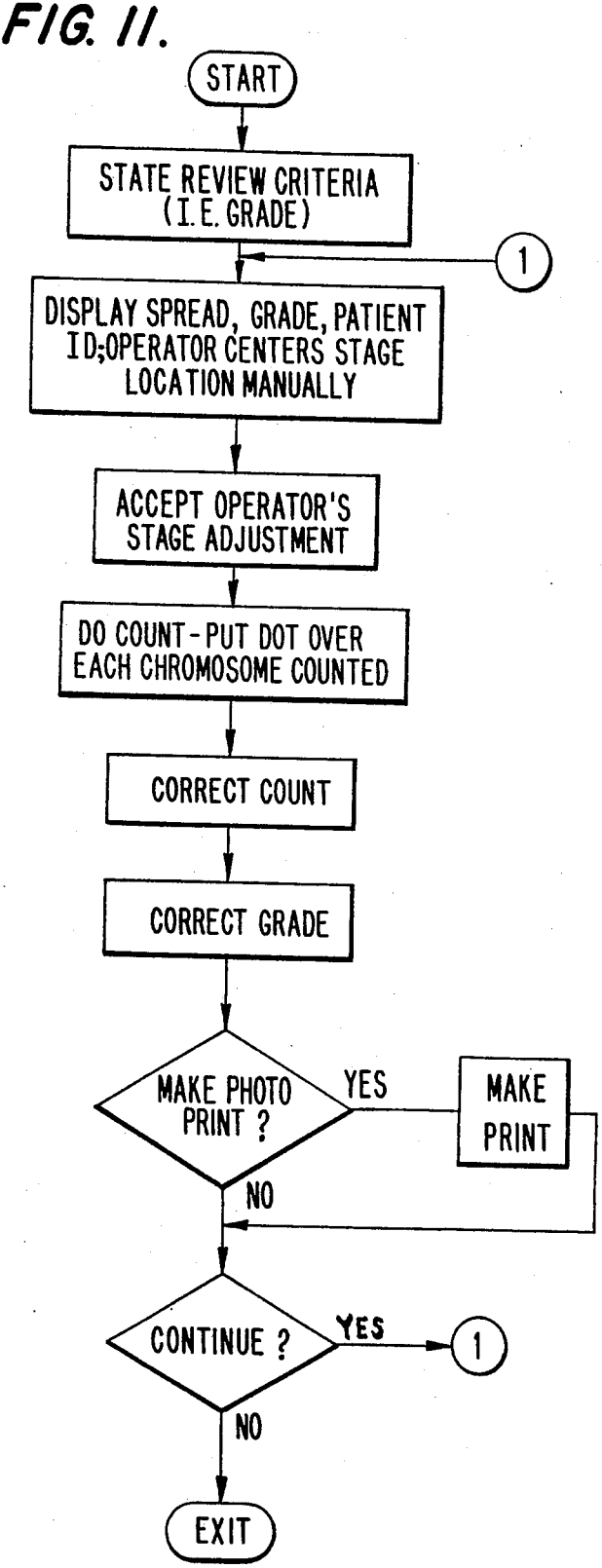

FIG. 11 is a flowchart of one embodiment of the computer program implemented by computer system 20 in performing metaphase evaluation. More particularly, the flowchart of FIG. 11 contains a series of blocks representing steps taken by the operator and/or the computer system 20 of FIG. 2 in performing metaphase evaluation, such metaphase evaluation being conducted in order to determine whether or not a valid metaphase spread has been detected. This subject has been discussed in detail earlier in this section in conjunction with a description of the operation of the system with reference to FIGS. 2 thru 8, and therefore need not be further discussed herein.

FIG. 12 is a flowchart by computer system 20 in performing computer karyotyping. More particularly, the flowchart of FIG. 12 contains a series of blocks representing a sequence of steps taken by the operator and/or the computer system 20 of FIG. 2 in performing computer karyotyping in the automated mode, as discussed in detail earlier in this section in conjunction with a description of the operation of the system with reference to FIGS. 2 thru 8. Accordingly, the steps contained in FIG. 12 need not be discussed in further detail here.

The flowcharts of FIGS. 9 thru 12 are otherwise self-explanatory; accordingly, they will not be discussed in any further detail herein.

While preferred forms and arrangements have been shown in illustrating the invention, it is to be clearly understood that various changes in detail and arrangement may be made without departing from the spirit and scope of this disclosure.

What is claimed is:

1. An operator-interactive automated chromosome analysis system for finding a chromosome spread disposed on a microscope slide and producing a karyotype, said system comprising:

a mechanized microscope stage on which the microscope slide is positioned for controlling microscope viewing of the chromosome spread;

a microscope positioned adjacent said mechanized microscope stage so that there is an optical pathway therebetween, said microscope providing a view of the chromosome spread and providing first and second optical outputs;

television camera means for receiving said first optical output and producing a corresponding video output;

monitor means connected to said television camera means and responsive to said video output for displaying a television image of said chromosome spread;

photographic printer means connected via a direct optical pathway to the second optical output of said microscope for producing a hardcopy representation of the chromosome spread;

metaphase detector means connected via a linear scanner optical pathway to said second optical output of said microscope for receiving optical data and for converting said optical data to digital data having a first logical state indicating absence of said chromosome spread and a second logical state indicating presence of said chromosome spread, said metaphase detector means processing said digital data so as to detect valid metaphase spreads within the chromosome spread; and computer means connected to said metaphase detector means and having an interactive mode for notifying the operator of the detection of a valid metaphase spread, said computer means arranging all detected valid metaphase spreads in an order corresponding to a predetermined order of metaphase spreads naturally occurring in human beings;

said monitor means responding to commands from said computer means for displaying said detected valid metaphase spreads as arranged by said computer means, whereby to produce said karyotype.

2. The system of claim 1, said metaphase detector means comprising a digitizer for converting said optical data to digital data.

3. The system of claim 2, wherein said digitizer comprises a linear scanner.

4. The system of claim 1, wherein said first logical state comprises logical zeros and said second logical state comprises logical ones.

5. The system of claim 1, wherein said metaphase detector means comprises a discriminator for detecting when said received optical data exceeds a predetermined threshold value and providing a corresponding first output, and for detecting when said received optical data is less than the predetermined threshold value and providing a corresponding second output.

6. The system of claim 5, wherein said received optical data comprises a plurality of sequentially received optical data, said discriminator processing a first, second and third optical datum to produce respective first, second and third discriminator outputs, said metaphase detector means further comprising a first delay circuit for delaying said first discriminator output by a first delay time, a second delay circuit for delaying said second discriminator output by a second delay time less than the first delay time, and a coincidence gate for simultaneously receiving said first discriminator output as delayed by said first delay circuit, said second discriminator output as delayed by said second delay circuit, and said third discriminator output.

7. The system of claim 6, wherein said coincidence gate determines when said first and third discriminator outputs indicate received optical data greater than said predetermined threshold value at the same time that said second discriminator output indicates received optical data less than said predetermined threshold value, whereupon said coincidence gate provides a detection output.

8. The system of claim 7, wherein said metaphase detector means further comprises a width counting circuit responsive to said detection output for counting to a predetermined count value, said width counting circuit inhibiting any further detection outputs until said predetermined count value is reached.

9. The system of claim 7, wherein said metaphase detector means further comprises a width measurement circuit responsive to said detection output for generating indications of the beginning and end, respectively, of the chromosome spread, whereby to obtain a measurement of the width of the chromosome spread.

10. The system of claim 9, wherein said width measurement circuit comprises a cover counter responsive to said detection output for assuming an initial count state and responsive to a clock input for counting to a full count state, and a detection flip-flop responsive to said detector output for providing a first output indicating the start of a cover and responsive to the full count state of said cover counter for providing a second output indicating the end of the cover.

11. The system of claim 7, wherein said metaphase detector means further comprises a counting circuit responsive to said detection output for counting the number of objects detected during a scan of the chromosome spread in order to determine whether the number of objects detected is sufficient to constitute a valid chromosome spread.

12. The system of claim 1, wherein said monitor means is connected via an optical pathway to said photographic printer means so as to enable said photographic printer means to produce said hardcopy representation of the chromosome spread.

13. The system of claim 1, wherein said computer means is connected to said television camera means for receiving video signals therefrom, said computer means comprising a video interface for converting said video signals to digital signals and storing the digital signals.

14. The system of claim 1, wherein said computer means comprises an interface circuit and a computer connected thereto, said interface circuit converting digital signals received from said computer to analog signals and sending said analog signals to said monitor means, in response to which said monitor means displays said detected valid metaphase spreads.

* * * * *